United States Patent
Engel et al.

(10) Patent No.: US 10,327,377 B2
(45) Date of Patent: Jun. 25, 2019

(54) AGRICULTURAL PRODUCT DELIVERY SYSTEM

(71) Applicant: CNH Industrial Canada, Ltd., Saskatoon (CA)

(72) Inventors: Gord Engel, Saskatoon (CA); Trevor Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 16/045,157

(22) Filed: Jul. 25, 2018

(65) Prior Publication Data

US 2018/0343788 A1 Dec. 6, 2018

Related U.S. Application Data

(62) Division of application No. 15/195,288, filed on Jun. 28, 2016, now Pat. No. 10,085,375.

(51) Int. Cl.
*A01C 7/04* (2006.01)
*A01C 7/08* (2006.01)
*A01C 21/00* (2006.01)

(52) U.S. Cl.
CPC .............. *A01C 7/046* (2013.01); *A01C 7/044* (2013.01); *A01C 7/082* (2013.01); *A01C 21/005* (2013.01)

(58) Field of Classification Search
CPC ........... A01C 7/082; A01C 7/081; A01C 7/08; A01C 7/00; A01C 7/046; A01C 7/044; A01C 7/042; A01C 7/04; A01C 21/005; A01C 21/00
See application file for complete search history.

(56) References Cited

U.S. PATENT DOCUMENTS

| | | |
|---|---|---|
| 3,860,146 A | 1/1975 | Bauman et al. |
| 4,449,642 A | 5/1984 | Dooley |
| 5,231,940 A | 8/1993 | Tjeerdsma |
| 5,431,117 A | 7/1995 | Steffens et al. |
| 5,915,312 A | 6/1999 | Meyer et al. |
| 5,915,313 A | 6/1999 | Bender et al. |
| 6,928,941 B1 | 8/2005 | Sternitzke |
| 8,132,521 B2 | 3/2012 | Snipes et al. |
| 8,141,504 B2 | 3/2012 | Dean et al. |
| 10,085,375 B2 * | 10/2018 | Engel ................ A01C 7/046 |

FOREIGN PATENT DOCUMENTS

EP 0598636 5/1994

* cited by examiner

*Primary Examiner* — Christopher J. Novosad
(74) *Attorney, Agent, or Firm* — Rebecca L. Henkel; Richard K. DeMille (57) ABSTRACT

An agricultural delivery system allows for the selective delivery of agricultural product (e.g., seeds or fertilizer) along one or more paths to row units according to a real-time location determined for the delivery system. The delivery system may include: a rotating drum configured to separate individual product for depositing along paths to row units; a sectional control system which may include wheels or gates for selectively cutting off product in the paths; and a controller in communication with a positioning system and the sectional control system. In operation, as the delivery system moves through a field; the controller may continuously determine a location for the delivery system. The controller may then operate to adjust individual product delivery, via the sectional control system, according to the location.

9 Claims, 5 Drawing Sheets

AGRICULTURAL PRODUCT DELIVERY SYSTEM

CROSS-REFERENCE TO RELATED APPLICATION

This application is a division of U.S. application Ser. No. 15/195,288, filed Jun. 28, 2016, the entirety of which is incorporated herein.

FIELD OF THE INVENTION

The present invention relates to farm implements and, more particularly, to a sectional control system for farm implements which may operate to adjust individual agricultural product delivery to row units according to a determined location.

BACKGROUND OF THE INVENTION

Farmers typically use agricultural product delivery systems for seeding large agricultural fields. Such systems often include a tractor hitched in a conventional manner to an air cart and a "planter" or "drill." Planters and drills are typically implements having row units for applying seed to the field as the implement is being pulled by the tractor. Typically, planters meter individual seeds while drills plant a mass or volume of seeds. The metering and placement accuracy is typically higher for planters than for drills. Thus, seeds of crops (e.g., corn) which require relatively high metering and placement accuracies for efficient growth may typically be planted using planters, while seeds of crops (e.g., wheat; oats) which grow efficiently in more varied seed environments may be planted by lower accuracy and less expensive drills. Despite the differences, both types of planting apparatuses typically include a seed hopper for storing a single type of seed to be planted.

When seeding large fields, it is desirable to maximize use of the entire area of the field. This ensures the most efficient use of space with the greatest crop yield possible. It is also desirable to minimize the amount of agricultural product used in the field, including minimizing the application of product to areas that should not receive product (such as areas which have already received product, or areas not amenable to growth). This ensures the most efficient use of a farmer's resources. This may also ensure avoiding disruption of already seeded ground. What is needed is an improved technique for precise seeding which maximizes growth in a field while minimizing the use of product and disruption of seeded ground.

SUMMARY OF THE INVENTION

The present invention provides an agricultural delivery system which may selectively deliver agricultural product (e.g., seeds or fertilizer) along one or more paths to row units according to a real-time location determined for the delivery system. The delivery system may include: a rotating drum configured to separate individual product for depositing along paths to row units; a sectional control system which may include wheels or gates for selectively cutting off product in the paths; and a controller in communication with a positioning system and the sectional control system. In operation, as the delivery system moves through a field, the controller may continuously determine a location for the delivery system. The controller may then operate to adjust individual product delivery, via the sectional control system, according to the location.

In one aspect, a CYCLO AIR® Planter, made by Case Corp. of Wisconsin, may be adapted to provide such sectional control. This could be installed, for example, onto a seeding toolbar configured to singulate seed into a secondary air pack for distributing the seed to openers on a planter or drill. The sectional control system could involve one or more wheels or slides which may operate to allow runs to be shut off. In one example, two slide gates could be configured from opposite ends of a drum to allow runs to be shut off from either left to right or right to left. Also, a mechanism could be provided to cut off pressurization to individual opener metering sections on a drum. The system could use real-time location information from a Global Positioning System (GPS) to determine which runs should be receiving product, and which runs should not be receiving product, when compared to a stored map.

In one aspect, an air cart could serve as a bulk tank for agricultural product (e.g., seeds or fertilizer). The air cart could supply the agricultural product to meters on a planter or drill and could control the amount of product being metered to the openers, as well as which openers receive the product, based upon a position in the field.

In one aspect, the CYCLO AIR® system may pick up agricultural product at holes of a cylindrical drum with pressurization and carry the product up and out of a reservoir to an opposite side of the drum. Then, the pressurization at certain holes may be interrupted, thereby allowing the product to fall into an air stream where the product may be carried to an opener, or allowing the product gravity to convey the product to an opener. The sectional control system could use a slide gate which may interrupt pressurization at certain holes by sliding over an outside surface of the drum. Two slides could be used, one operating from each side, with each slide capable of blocking the entire delivery area of the drum. Accordingly, product could be metered to an even higher level of accuracy than current volumetric metering systems. This may also allow delivery of more difficult (smaller) grains, such as canola and cereal grains, with improved accuracy.

Specifically then, one aspect of the present invention provides an agricultural product delivery system including: a plurality of row units; a manifold configured to receive agricultural product for delivery to the row units; a cylindrical drum secured to a shaft and configured to rotate, the drum having holes arranged in circumferentially spaced rows, each row having a plurality of holes with diameters smaller than agricultural product delivered by the manifold; a blower assembly configured to pressurize the drum so that a force retains agricultural product against holes of the drum as the drum rotates; an actuator in communication with a release wheel, the actuator configured to cycle the release wheel between first and second positions, in which the first position is operable to close a hole of the drum to eliminate the force retaining the agricultural product to the hole so that the agricultural product drops from the hole, and in which the second position is operable to open the hole of the drum to retain the force retaining the agricultural product to the hole; and a controller in communication with the actuator. The controller may execute a program stored in a non-transient medium operable to: (a) determine a location of the agricultural product delivery system in a field using a position sensor; and (b) control the actuator to cycle the release wheel between the first and second positions according to the location.

In another aspect, the present invention provides an agricultural product delivery system including: an agricultural vehicle configured to move an implement, the implement having a plurality of sections, each section having: a plurality of row units; a manifold configured to receive agricultural product for delivery to the row units; a cylindrical drum secured to a shaft and configured to rotate, the drum having holes arranged in circumferentially spaced rows, each row having a plurality of holes with diameters smaller than agricultural product delivered by the manifold; a blower assembly configured to pressurize the drum so that a force retains agricultural product against holes of the drum as the drum rotates; and an actuator in communication with a release wheel, the actuator configured to cycle the release wheel between first and second positions, in which the first position is operable to close a hole of the drum to eliminate the force retaining the agricultural product to the hole so that the agricultural product drops from the hole, and in which the second position is operable to open the hole of the drum to retain the force retaining the agricultural product to the hole; and a controller in communication with an actuator in each section. The controller may execute a program stored in a non-transient medium operable to: (a) determine a location of the agricultural product delivery system in a field using a position sensor; and (b) control the actuator in each section to cycle release wheels between the first and second positions according to the location.

In another aspect, the present invention provides an agricultural product delivery system including: a plurality of row units; a manifold configured to receive agricultural product for delivery to the row units; a cylindrical drum secured to a shaft and configured to rotate, the drum having holes arranged in circumferentially spaced rows, each row having a plurality of holes with diameters smaller than agricultural product delivered by the manifold; a blower assembly configured to pressurize the drum so that a force retains agricultural product against holes of the drum as the drum rotates; first and second actuators in communication with first and second release gates, respectively, the first and second actuators configured to cycle each of the first and second release gates, respectively, between first and second positions, in which the first position is operable to close a hole of the drum to eliminate the force retaining the agricultural product to the hole so that the agricultural product drops from the hole, and in which the second position is operable to open the hole of the drum to retain the force retaining the agricultural product to the hole; and a controller in communication with the first and second actuators. The controller executing a program stored in a non-transient medium operable to: (a) determine a location of the agricultural product delivery system in a field using a position sensor; and (b) control the first and second actuators to cycle the first and second release gates, respectively, between the first and second positions according to the location.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
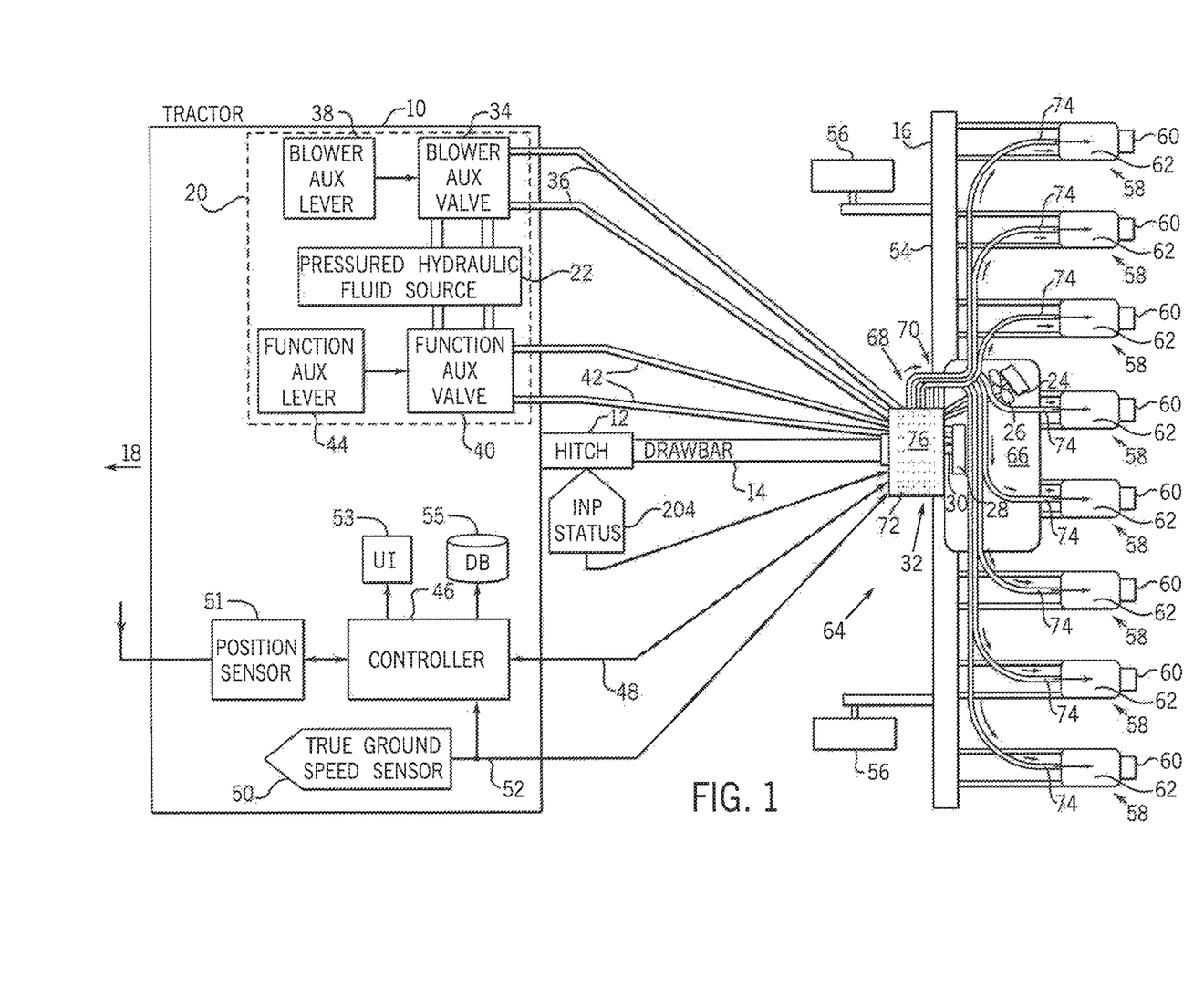
FIG. 1 is a schematic diagram illustrating an agricultural vehicle pulling a planting apparatus equipped with selectable row units according to the present invention.

Referring to FIG. 1, an agricultural vehicle such as a tractor 10 may include a hitch assembly 12 for connection to a drawbar 14 of an implement 15 which may include one or more sections 16 (implement 15 is illustrated in FIG. 1 as having only one section 16 for ease of understanding). Tractor 10 includes an engine and drive train (not shown) for propelling tractor 10 and the implement 15 in a forward direction represented by arrow 18. Tractor 10 could be, for example, a MAGNUM® tractor and the implement 15 may be a 955 Series CYCLO AIR® Planter, both made by Case Corp. of Wisconsin. Some features of the CYCLO AIR® planters are described in U.S. Pat. Nos. 3,762,603, 3,848,552, 3,860,146, 3,885,704, 4,128,191, 4,758,119, 5,915,312 and 5,915,313 herein incorporated by reference. Other tractors could be used to move other types of planting implements including mounted, semi-mounted and trailing planters and drills.

Tractor 10 may include an auxiliary (AUX) hydraulic system 20 for supplying pressurized hydraulic fluid from a source 22 (e.g., an engine-driven pump) to attachments such as section 16 of the implement 15. AUX hydraulic system 20 can power two hydraulic motors on the section 16: a blower hydraulic motor 24 which drives a fan 26 to generate air pressure used for seed metering and distribution; and a function hydraulic motor 28 which turns a shaft 30 to drive a metering system 32. A blower AUX valve 34 controls the flow of fluid via conduits 36 to blower hydraulic motor 24 depending on the position of a blower AUX lever 38, and a function AUX valve 40 controls the flow of fluid via conduits 42 to function hydraulic motor 28 depending on the position of a function AUX lever 44. AUX levers 38 and 44, which may be located in the tractor cab, are treated herein as turning the fluid flow to the section 16 on and off, and it is assumed that the operator may set both levers to provide sufficient power for hydraulic motors 24 and 28. For larger planters, fluid to hydraulic motors 24 and 28 can be supplied by a closed hydraulic system on the section 16 driven by a power take-off shaft of tractor 10.

Tractor 10 may also be equipped with a controller 46 which may communicate with the section 16 via a bus 48 (e.g., such as a bidirectional RS-485 interface) as described below. A true ground speed sensor 50 (e.g., a radar device mounted to the body of tractor 10) may generate a signal applied to the controller 46 and the section 16 via bus 52 which has a frequency proportional to true ground speed. Sensor 50, however, can also include a magnetic pickup sensor which senses the speed of the vehicle's undriven wheels. An estimated true ground speed can be obtained from a pickup sensor associated with the driven wheels or transmission. A position sensor 51, which may be part of a Global Positioning System (GPS) communicating with satellites and/or other elements via a corresponding antenna, may generate a real-time location signal applied to the controller 46. The controller 46 may communicate with a user interface 53 (UI) for exchanging input/output (I/O) with an operator of the tractor 10. The controller 46 may also communicate with a database 55 (DB) which may store maps and related software in a non-transient medium as will be further described.

Each section 16 of the implement 15 may include a frame 54 (i.e., a toolbar) pulled by tractor 10 via drawbar 14 and supported above the ground by carrying wheels 56. Secured to frame 54 are row units 58 (section 16 illustrated in FIG. 1 has eight row units 58 illustrated by way of example), preferably using bolts for flexibility in changing row spacing and planter configuration. Row units 58 may form furrow in the ground and plant dispensed seed in the furrows, and may include offset disk openers (not shown) to penetrate residue and soil, gauge wheels (not shown) to maintain constant planting depth and seed placement, furrow forming points (not shown) to define the seed trenches formed by the disk openers, applicators to place seed in the furrows, covering disks (not shown) to fill the furrows, and press wheels 60 to compress soil over the furrows. Hoppers 62 may be provided to store chemicals (e.g., fertilizers) applied during planting.

Frame 54 may support a seed dispensing system 64 for multiple types of seed which includes an enclosure 66 for enclosing blower assembly 24-26, function assembly 28-30, a central-fill hopper (not shown) for storing multiple types of seed, a switch assembly (not shown) for selecting a type of seed, and components of a variable rate and type control system. Dispensing system 64 may also include a distribution assembly 68 which includes metering system 32 for metering individual seeds and a delivery system 70 for delivering metered seeds to row units 58. Metering system 32 and delivery system 70 include a singulator or seed selector 72 for separating individual seeds which are deposited into a manifold for delivery to row units 58 via seed tubes 74.

Dispensing system 64 is a pneumatic system which uses pressurized air for metering and distributing seed. However, portions of dispensing system 64 can be used on planting apparatuses such as gravity planters, or planters using air pressure only for metering or for distribution. Seed stored in enclosure 66 may be released as described below into the bottom of a perforated, cylindrical drum 76 secured to shaft 30 and forming part of singulator 72. Drum 76 has holes arranged in circumferentially spaced rows (e.g., 8 rows/8-row planter), each row having a plurality of holes with diameters smaller than the seed being planted. The arrangement of drum 76 depends upon the planter and seed type, and Case Corp. makes a full line of interchangeable drums. Blower assembly 24-26 pressurizes drum 76 and creates an air pressure differential above atmospheric. As function assembly 28-30 rotates drum 76, the pressure differential causes each hole to pick up one seed at the bottom of drum 76, and retains the picked-up seed against the hole as drum 76 rotates. After further rotation moves the retained seeds above the manifold, the holes are plugged by release wheels or gates (not shown) outside drum 76 to eliminate the force retaining the seeds and to cause the seeds to drop into the manifold. The seeds are then pushed by a cushion of pressurized air from blower assembly 24-26 through seed tubes 74 to row units 58.

The seed application rate depends upon ground speed and the rotation rate of drum 76. A constant application rate is obtained by driving shaft 30 via a transmission (not shown) coupled to carrying wheels 56. However, a variable application rate may be obtained by controlling the rotation rate of drum 76 as a function of ground speed and a commanded application rate. Shaft 30 may be driven at a variable rate by function hydraulic motor 28 depending upon settings of an electrohydraulic valve (not shown) also within enclosure 66. The electrohydraulic valve may receive fluid from function AUX valve 40 and regulates flow to motor 28 in response to control signals generated as described below.

Figure 2:
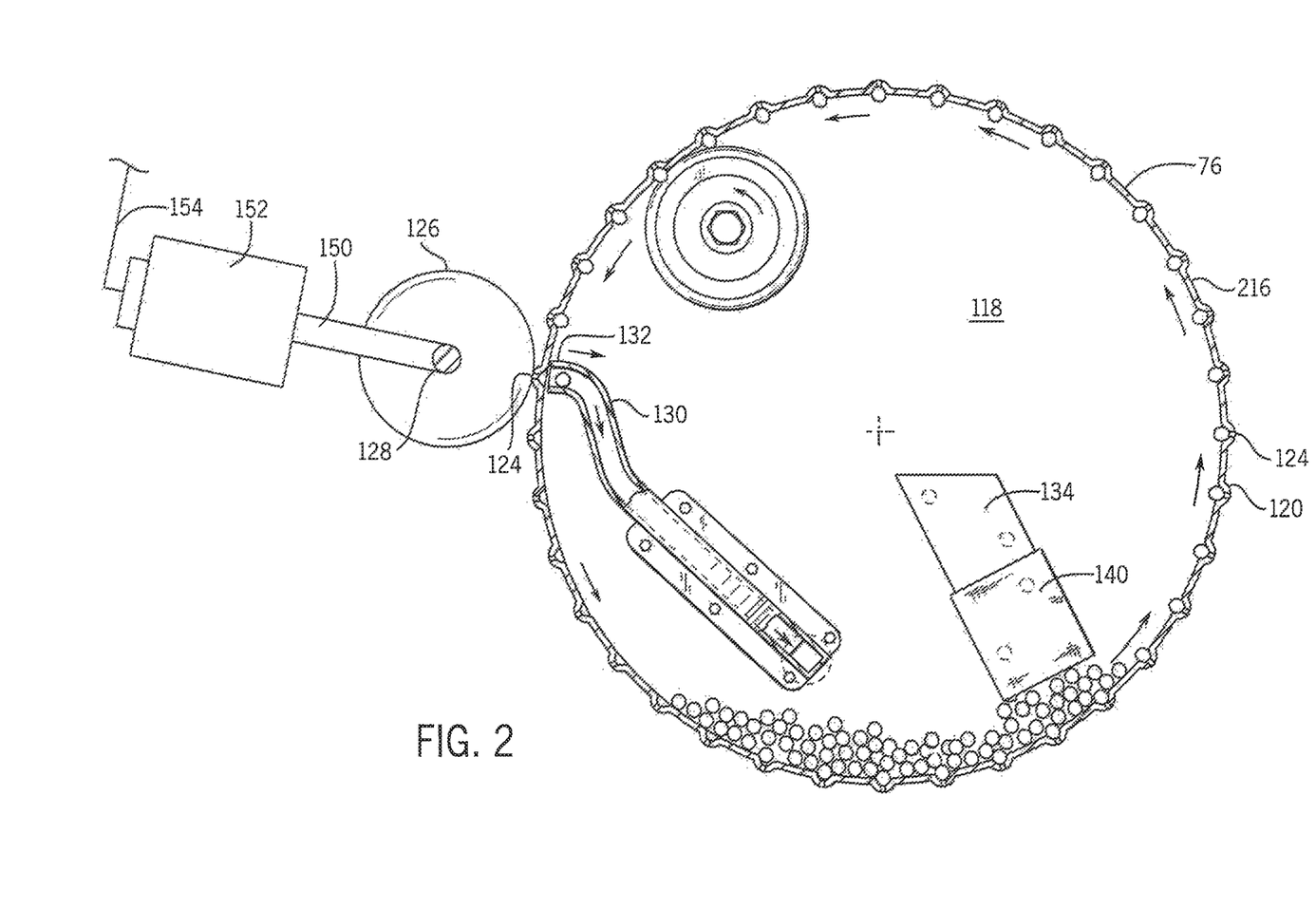
FIG. 2 is a cross-sectional view of a cylindrical drum of FIG. 1 with an actuator in communication with a release wheel.

With additional reference to FIG. 2, in operation, each drum 76 may rotate about a substantially horizontal axis. The drum 76 may be supported by, and rotationally sealed against, a base plate 118. The drum 76 may have a plurality of indentations 120 with each having a hole 124 at its base through which air may escape from the drum to the atmosphere. The fan 26 may supply air into the interior of the drum 76, and maintains it at a pressure preferably about 5 to 15 ounces per square inch above atmospheric pressure. Air escapes to the atmosphere from the drum through each of the holes 124 in the drum indentations.

Grain may be maintained at a relatively constant level in the base of the drum 76, tumbling in the bottom of the drum as the drum rotates. As the seed tumbles, and assuming it is maintained at the proper depth in the drum, a single seed will fall into each indentation. Due to the flow of air out holes 124 at the bottom of the indentation, each seed will become trapped there. As the drum continues to rotate, each of these seeds will be lifted to the uppermost point in the drum, where upon it will begin to descend.

To release seeds from their respective indentations, one or more flexible release wheels 126 or gates may be pressed against the outside of the drum. For example, as the drum rotates, wheels 126 on axles 128 may roll across the outer surface of the drum 76. During this rotation, the wheels 126 will periodically cover and seal off one or more holes 124. The effect is to selectively release one or more seeds per row.

As seeds are released by the wheels 126, seeds fall into a manifold 130 which may be comprised of 8 individual passageways. Each of the passageways comprising the manifold 130 may be coupled to the seed tubes 74 which lead to the row units 58. The manifold 130 may be fixed to the base plate 118, which may hold a free end 132 of the manifold 130 in close proximity to the rotating drum 76.

Seed may be delivered to the drums 76 through flexible hoses which are coupled to a seed delivery tube 134. The seed delivery tube 134 may be directed downward toward the bottom of drum 76, for example, at an angle of between 15 and 35 degrees. The seed delivery tube 134 may preferably be rectangular in axial cross-section, measuring between 1 and 4 inches square, and more preferably between 1.75 and 2.75 inches square. The seed delivery tube 134 may have a top surface 136, a bottom surface 138 and two vertical side walls 140. About 5 inches of the seed delivery tube 134 may extend into the drum 76, terminating in an open end, the edge of which may define a horizontal plane parallel to, and equidistantly spaced from, the bottom of the drum 76. A gap between the open end and the bottom of the drum 76 may preferably be between 0.5 and 1.0 inches, with a wider gap being suitable for operation in adverse conditions, such as side hills.

The axles 128 of the wheels 126 may be connected to plungers 150 which may be driven by actuators 152. Accordingly, the actuators 152 in communication with the wheels 126 may cycle the wheels 126 between first and second positions. The first position (illustrated in FIG. 2) may be operable to close holes 124 of the drum 76 to eliminate the force retaining the agricultural product to the holes 124. As a result, the agricultural product may drop from the holes, and in one aspect, may be received by the manifold 130 for delivery to the row units. The second position may be operable to open the holes 124 of the drum 76 to retain the force retaining the agricultural product to the holes 124. In the second position, the agricultural product may bypass the manifold 130 as the agricultural product continues rotating with the drum 76 back to the bottom. It will be appreciated that a variety of configurations may be realized for cycling between first and second positions with respect to the drum 76 within the scope of the invention.

The actuators 152 may comprise solenoids or coils which may be responsive to electrical signals 154. The electrical signals 154 may be driven by the controller 46, for example, according to program stored in a non-transient medium being executed by the controller 46. In one aspect, the controller 46 may determine a real-time location of the agricultural product delivery system, including the tractor 10 and the implement 15, in the field using the position sensor 51. The controller 46 may then drive the electrical signals 154 to cycle the wheels 126 between the first and second positions according to the location. Moreover, the controller 46 may compare the determined location to a map stored in the database 55, and drive the electrical signals 154 to cycle the wheels 126 between the first and second positions according to the location on the map.

For example, the map may indicate a particular area is not amenable to growth (such a rock bed, water deposit, or the like), or has already received product (based on real-time updates which may be received as the tractor 10 moves through the field). Upon determining a location near the particular area undesirable for agricultural product, the controller 46 may cycle wheels 126, via the electrical signals 154, for corresponding row units 58 in order to retain agricultural product over the particular area. This may occur while simultaneously cycling other wheels 126, via the electrical signals 154, to release agricultural product over an unaffected area.

Figure 3:
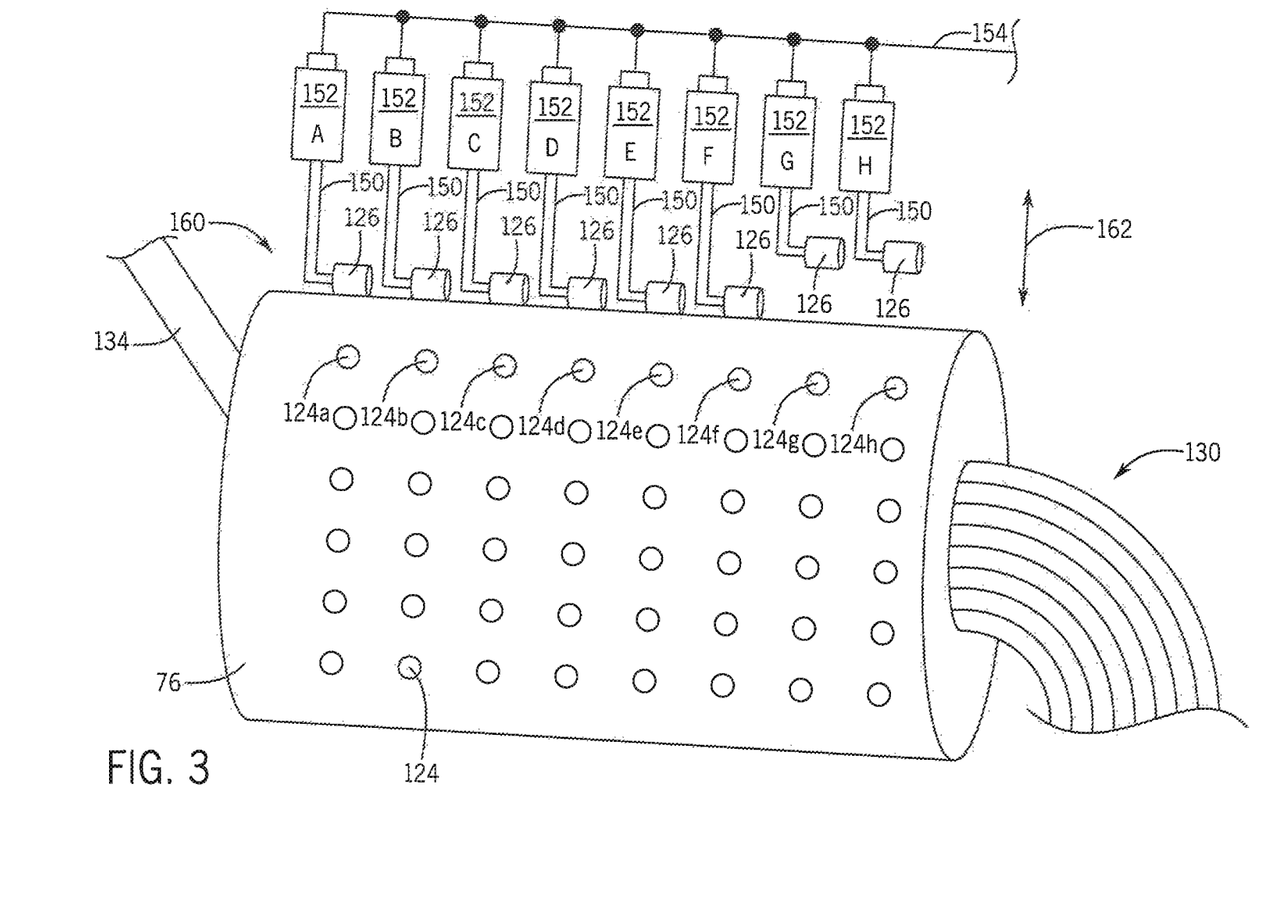
FIG. 3 is a front view of the cylindrical drum of FIG. 2.

With additional reference to FIG. 3, a front view of the drum 76 illustrates multiple wheels 126, which may be positioned with respect to holes 124 in a common row 160, and corresponding actuators 152 for the wheels 126. In one aspect, there may be one wheel 126 for each hole 124 in the common row 160, such as eight wheels 126 with eight corresponding actuators 152 (labelled "A" through "H"), corresponding to eight holes 124 in the common row 160, for the eight row units 58. As shown by way of example, actuators A through F are in the first position, preparing to close corresponding holes 124a through 124f, so that the agricultural product drops from holes 124a through 124f, while actuators G and H are in the second position, preparing to open corresponding holes 124g and 124h, so that the agricultural product is retained in holes 124g and 124h. The release wheels 126 may move perpendicularly with respect to the drum 76, illustrated by arrow 162, when cycling between the first and second positions.

Figure 4:
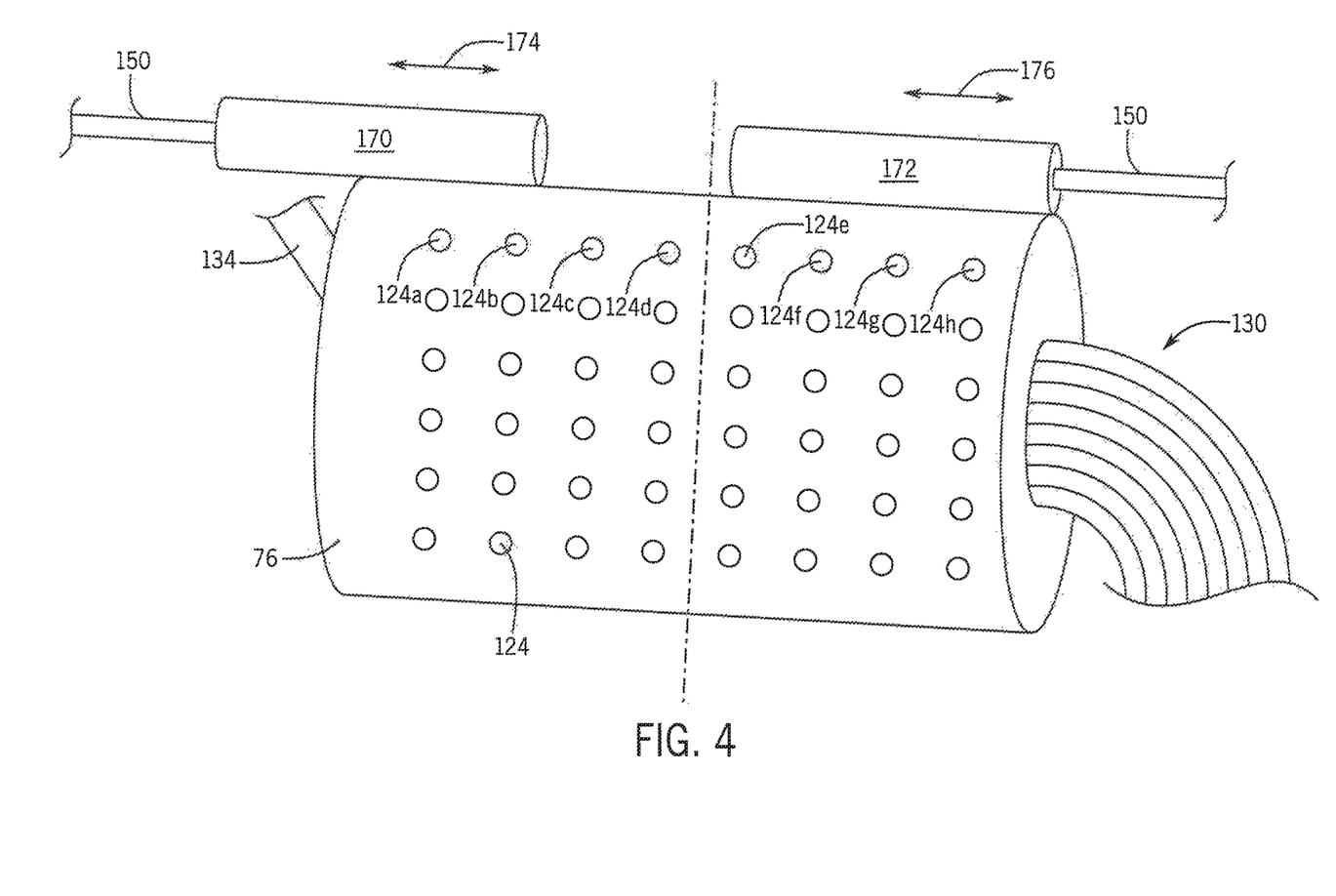
FIG. 4 is a front view of a cylindrical drum with release gates according to another aspect of invention.

Referring now to FIG. 4, a front view of an alternative arrangement having a drum 76 and first and second release gates 170 and 172, respectively, (connected to plungers 150 and, in turn, actuators controlled by the electrical signals 154) is provided according to another aspect of invention. In one aspect, the first release gate 170 may move laterally with respect to the drum 76, illustrated by arrow 174, from left most point in which the first release gate 170 opens a first half of the holes 124 (hole 124a through hole 124d), to a right most point in which the first release gate 170 closes the first half of the holes 124 (hole 124a through hole 124d), and anywhere in between. Similarly, the second release gate 172 may move laterally with respect to the drum 76, illustrated by arrow 176, from right most point in which the second release gate 172 opens a second half of the holes 124 (hole 124e through hole 124h), to a left most point in which the second release gate 172 closes the second half of the holes 124 (hole 124e through hole 124h), and anywhere in between. As shown by way of example, the first release gate 170 prepares to close holes 124a and 124b, and prepares to open holes 124c and 124d, while the second release gate 172 prepares to close holes 124e through 124h. It will be appreciated that a variety of configurations may be realized for implementing wheels and/or gates, including a single wheel or gate which may span the entire distance of the drum 76, whether perpendicularly and/or laterally. Such variations are deemed within the scope of the invention.

Figure 5:
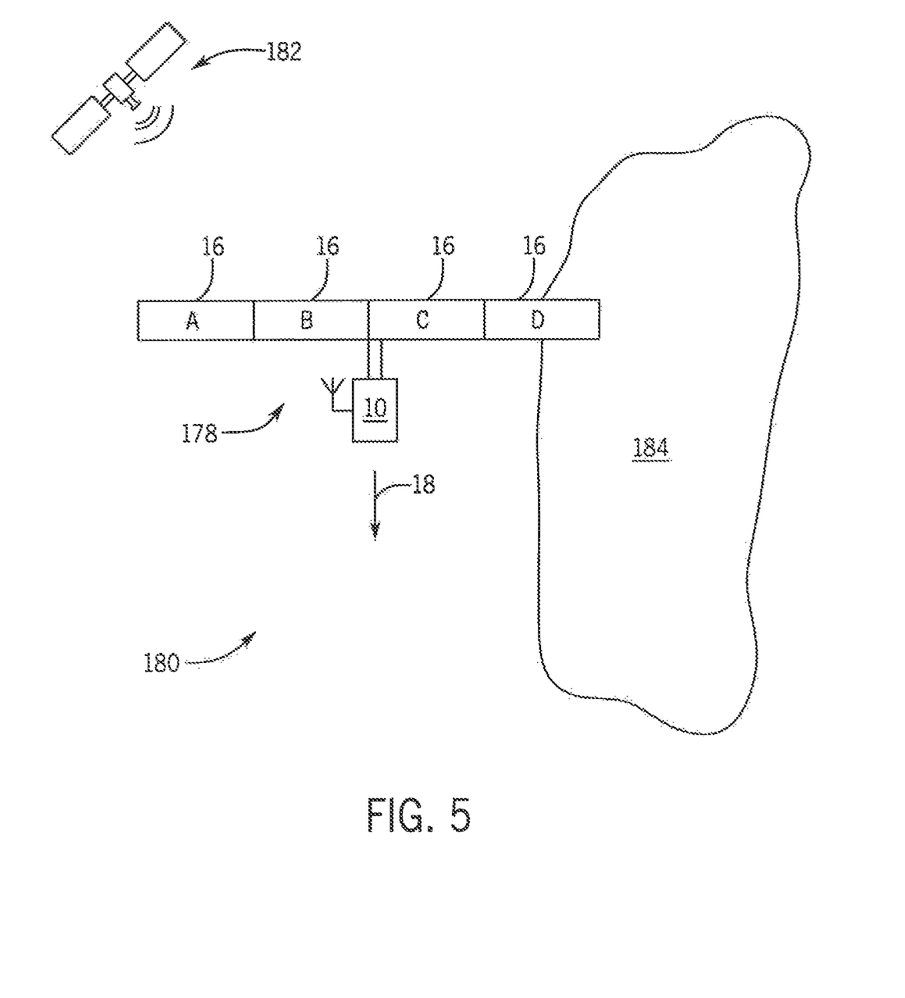
FIG. 5 is a diagram illustrating an agricultural vehicle pulling a planting apparatus equipped with multiple sections in a field according to the present invention.

Referring now to FIG. 5, a diagram illustrating an agricultural product delivery system 178, including the tractor 10 moving the implement 15 in a field 180, is shown by way of example. Here, the implement 15 may include four sections 16 (labeled "A" through "D"). As the product delivery system 178 moves through the field 180, the controller 46 may continuously determine a real-time location for the product delivery system 178, such as by communicating with one or more GPS satellites 182 using the position sensor 51. The controller 46 may reference a map in the database 55, which may indicate, for example, that a portion of the product delivery system 178, such as the last half of row units 58 of section D, is entering or in a particular area 184 that is not amenable to growth (such a rock bed, water deposit, or the like). Accordingly, the controller 46 may control one or more actuators 152 which may correspond to wheels 126 or gates for the last half of holes 124 in the drum 76 of section D (corresponding, in turn, to the last half of row units 58 of section D), to open so that agricultural product is retained in such holes and not applied to the area 184.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. An agricultural product delivery system comprising:
   an agricultural vehicle configured to move an implement, the implement having a plurality of sections, each section having:
   a plurality of row units;
   a manifold configured to receive agricultural product for delivery to the plurality of row units;
   a cylindrical drum secured to a shaft and configured to rotate, the cylindrical drum having holes arranged in circumferentially spaced rows, each row having a plurality of holes with diameters smaller than agricultural product delivered by the manifold;
   a blower assembly configured to pressurize the cylindrical drum so that a force retains agricultural product against holes of the cylindrical drum as the cylindrical drum rotates; and
   an actuator in communication with a release wheel, the actuator configured to cycle the release wheel between first and second positions, wherein the first position is operable to close a hole of the cylindrical drum to eliminate the force retaining the agricultural product to the hole so that the agricultural product drops from the hole, and wherein the second position is operable to open the hole of the cylindrical drum to retain the force retaining the agricultural product to the hole; and a controller in communication with an actuator in each section, the controller executing a program stored in a non-transient medium operable to:

(a) determine a location of the agricultural product delivery system in a field using a position sensor; and (b) control the actuator in each section to cycle release wheels between the first and second positions according to the location.

2. The agricultural product delivery system of claim 1, wherein the actuator in communication with the release wheel in each section is among a plurality of actuators in communication with release wheels, and wherein the plurality of actuators are configured to cycle the release wheels between first and second positions with respect to holes in a common row.

3. The agricultural product delivery system of claim 2, wherein a release wheel is provided for each hole in the common row.

4. The agricultural product delivery system of claim 2, wherein the release wheels move perpendicularly with respect to the cylindrical drum when cycling between the first and second positions.

5. The agricultural product delivery system of claim 2, wherein the plurality of actuators in communication with release wheels include a first actuator in communication with a first release wheel and a second actuator in communication with a second release wheel, and wherein the first actuator cycles the first release wheel with respect to a first half of holes in the common row and the second actuator cycles the second release wheel with respect to a second half of holes in the common row.

6. The agricultural product delivery system of claim 5, wherein the first and second release wheels move laterally with respect to the cylindrical drum when cycling between the first and second positions.

7. The agricultural product delivery system of claim 1, wherein the controller is further operable to compare the location to a map and control the actuator in each section to cycle the release wheel between the first and second positions according to the location on the map.

8. The agricultural product delivery system of claim 1, wherein the manifold in each section is configured to receive agricultural product from the cylindrical drum when the release wheel is in the first position.

9. The agricultural product delivery system of claim 1, wherein the position sensor is part of a Global Positioning System (GPS).

* * * * *